June 9, 1959 N. T. BALDANZA 2,889,651
PRODUCTION OF MULTI-COLOR THREE-DIMENSIONAL PLAQUES
Filed March 27, 1956 2 Sheets-Sheet 2
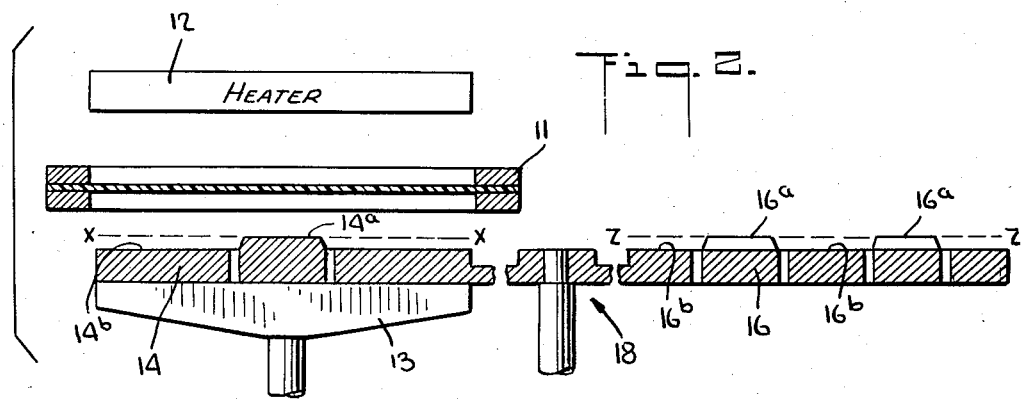
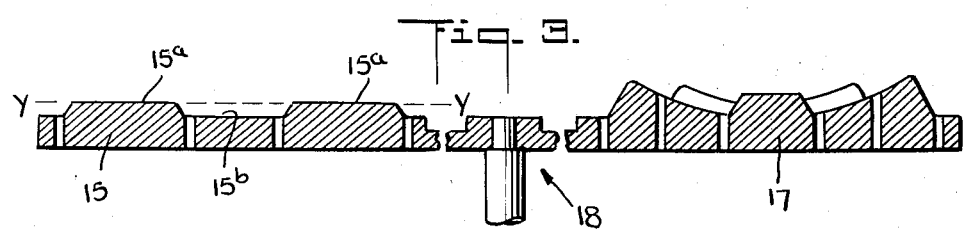
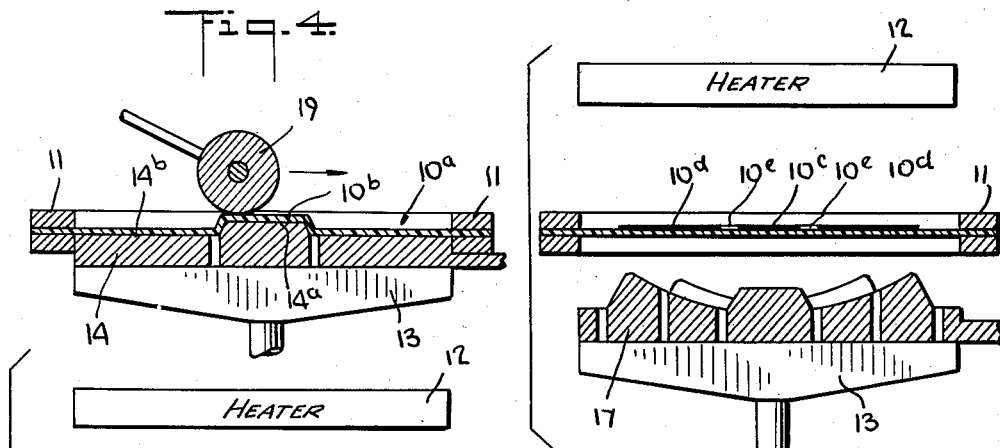
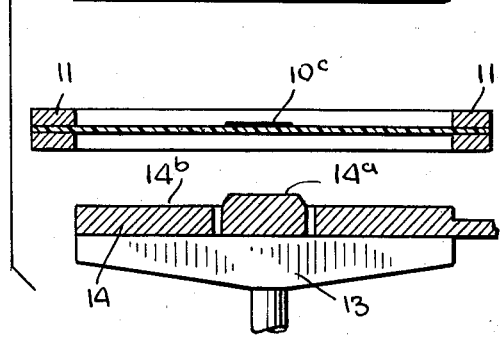
INVENTOR.
NICHOLAS T. BALDANZA
BY
Barnett + Barnett
ATTORNEYS United States Patent Office 2,889,651
Patented June 9, 1959

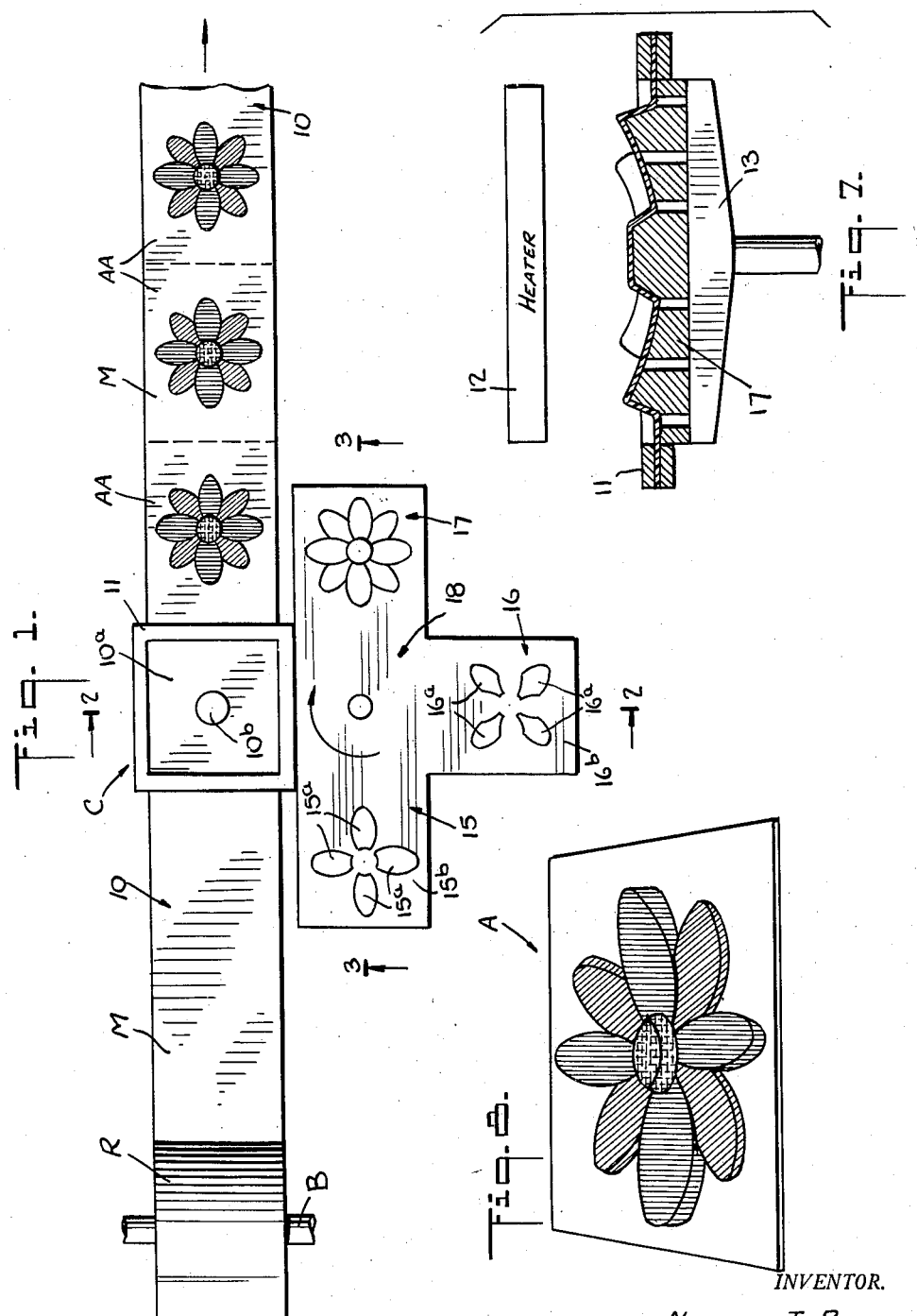

2,889,651

PRODUCTION OF MULTI-COLOR THREE-DIMENSIONAL PLAQUES

Nicholas T. Baldanza, Rutherford, N.J.

Application March 27, 1956, Serial No. 574,228

10 Claims. (Cl. 41—24)

This invention relates to a method of producing multi-colored three-dimensional or embossed plaques and more particularly is directed to color printing and vacuum forming sheets having thermoplastic properties as a continuous process in the production of such plaques.

Among the objects of the invention is to generally improve production methods of the character described to facilitate printing and vacuum forming of three-dimensional decorative plaques in rapid sequence at the same locale, which method shall be capable of accomplishment by relatively simple and inexpensive apparatus and relatively unskilled labor, which shall obviate present preliminary multi-color printing or decorating by conventional costly methods requiring either expensive machinery, skilled labor or both, which method shall utilize shallow drawing molds to provide raised color separation distortion patterns directly on thermoplastic sheets having a so-called elastic memory for accomplishing the multi-color printing, which molds are relatively inexpensive to prepare and can be corrected easily on the job for minor errors in registration and the like, and which method shall be practical and efficient to a high degree in use.

Other objects of the invention will in part be obvious and in part hereinafter pointed out.

The invention accordingly consists in the features of construction and method, combinations of elements, arrangements of parts and steps in the process of manufacture which will be exemplified in the arrangements and method hereinafter described and of which the scope of application will be indicated in the claims following.

In the accompanying drawings in which is shown an illustrative embodiment of the invention:

Fig. 1 is a diagrammatic plan view of a web of thermoplastic sheet material undergoing the process of printing and vacuum forming embodying the invention showing an advanced section tri-color printed and vacuum formed into a three-dimensional relatively high relief surface ready for severing from the web as completed articles, a mid-section of the web positioned in a retaining frame at a station for undergoing the printing of a first color and a trailing section of sheet material being fed into the frame from a supply roll. A turret platform mounting three color separation shallow drawing molds and a final deep drawing mold is shown with the first of the color separation molds in register beneath the sheet retaining frame, the advanced section and the mid-section of the web showing the plaque decorations being lined for the colors yellow, red and green as illustrative of a multi-color plaque.

Fig. 2 is a sectional fragmentary view taken on line 2—2 in Fig. 1 showing the shallow drawing separation mold for the yellow colored portion of the plaque in position beneath the sheet material web clampingly held in a retaining frame at the printing and vacuum forming station ready for application of heat and suction, the green separation mold being shown at the opposite side of the turret mounting.

Fig. 3 is a sectional fragmentary view taken on line 3—3 in Fig. 1 showing the shallow drawing separation mold for the red colored portion of the plaque on the turret platform opposite the deep drawing final mold.

Fig. 4 is a fragmentary sectional view similar to Fig. 2 but showing the thermoplastic sheet shallow drawn by the yellow separation mold after low heating, vacuum forming and cooling ready for having the resulting raised areas inked by a yellow ink applying roller.

Fig. 5 is a sectional view similar to Fig. 2 showing the yellow separation mold removed from contact with the sheet material in the retaining frame after the yellow ink has been applied and the sheet material heated to return to its original flat configuration.

Fig. 6 is a sectional view showing the sheet material in the retaining frame at the printing and forming station after having had the three color inks, namely, yellow, red and green, applied thereto ready for final vacuum forming by the deep drawing mold.

Fig. 7 is a sectional view similar to Fig. 6 showing the vacuum forming step, and Fig. 8 is a perspective view of the finished tri-colored three-dimensional plaque formed by the method embodying the invention after being cut from the web.

The novel method generally comprises the steps of heating a thermoplastic sheet of any suitable material possessing an elastic memory, such as, vinyls, styrenes, acetates and butyrates, to a required minimum temperature, vacuum forming the heated sheet to provide a low relief predetermined distortion pattern lying in a single plane spaced from the original plane of the sheet. After sufficient cooling, the low relief distortion pattern is ink rolled to provide a surface coated distortion pattern, then the sheet having the inked low relief distortion pattern is heated to a required high relief vacuum forming temperature. During the second heating, the elastic memory of the sheet reduces the low relief distortion pattern to a flat surface preparatory to the final high relief vacuum forming step; the latter step is then performed providing after cooling a finished high relief three-dimensional plaque with an inked surface design in proper register to the high relief subject matter of the plaque.

The minimum temperature utilized for forming the low relief distortion pattern will be determined for the particular sheet material used in accordance with its vacuum forming characteristics and properties and will be lower than the normal required high relief vacuum forming temperature for each material. Where the low relief vacuum forming step is repeated several times to provide multiple distortion patterns in three or more colors, as hereinafter more fully described, the use of minimum temperature in the low relief vacuum forming steps becomes important for preventing undesirable distortion of the colored surface areas in the finished product.

Referring in detail to the drawings, M denotes a thermoplastic sheet material of the type used in making vacuum formed plaques and the like three-dimensional multi-colored decorative articles A formed with raised, embossed or sculptured surface ornamentation in the form of pictures, figures or abstract designs. Such sheet material M, as is utilized in practicing the invention supplied as a web 10 from a roll R or as a stack of sheets (not shown) precut to a predetermined size, must also possess an elastic memory, that is, the property of returning to its original flat sheet form upon reheating after first being formed by heating and distortion out of the flat plane thereof into high or bas-relief and cooled.

In an embodiment of the invention diagrammatically shown in Fig. 1, roll R is mounted on a suitable shaft B positioned for unreeling and feeding web 10 into retaining frame 11 located at station C for clamp supporting successive mid-sections 10a of web 10 about the periphery thereof while performing the various consecutive operations on each midsection 10a in a continuous process as hereinafter described for manufacturing articles A.

Also located at station C is a heater 12, a vacuum forming device 13 preferably positioned above and below frame 11, respectively, and a turret platform 18 mounting a series of three color separation molds 14, 15, 16 and a final mold 17 arranged to be selectively brought into registry below frame 11.

In the illustrative embodiment of the invention here shown, three color separation molds are utilized, namely, mold 14 for yellow, mold 15 for red and mold 16 for green, it being understood that additional colors may be utilized where desired by providing additional separation molds. Also, the distortion pattern areas defined by each of the separation molds may overlap to obtain resultant colors, such as, secondary colors, shades and hues in the well understood manner.

Molds 14, 15 and 16 are formed with raised areas or plateaus 14a, 15a and 16a lying in planes X—X, Y—Y and Z—Z spaced a distance to about ⅟₁₆th to ³⁄₃₂nds of an inch above the mold surfaces 14b, 15b and 16b, respectively, to provide a shallow draw for producing surfaces 10b of low relief when vacuum forming sheet material 10 thereon. Each of the raised areas 14a, 15a and 16a represents a color separation distortion pattern and is analogous to patterns produced by color separation printing plates well known in the art for printing a multi-colored distortion pattern on a flat sheet surface prior to vacuum forming the sheet into a three-dimensional multi-colored plaque.

The distortion patterns for making molds 14, 15 and 16 may be obtained by any well known method. For example, a vinyl sheet having an elastic memory is vacuum formed into a three-dimensional configuration, such as, into article A. The color areas to be yellow are then marked off on the three-dimensional surface which on heating returns to its original flat surface, the marked off areas now giving the desired distortion pattern for the color yellow from which mold 14 can readily be made to reproduce the distortion pattern as a low relief surface 10b. Using the same method for each of the other colors required to complete article A, molds 15 and 16 are made.

Having prepared suitable shallow drawing color separation distortion pattern molds 14, 15 and 16 and deep drawing final die 17, the novel method embodying the invention may be carried out partly by hand with the aid of simple apparatus shown diagrammatically in the drawings or by more complex semi-automatic machinery designed for the purpose. Web 10 of thermoplastic sheet material M suitable for vacuum forming preferably of .010 to .020 gauge is unreeled from roll R and a leading mid-portion 10a clamped amout the periphery thereof in retaining frame 11 where it is held during the coloring and final forming steps. Mold 14 having been brought into position on the vacuum forming device 13 to register with frame 11 and web mid-portion 10a, the latter is heated by means of heater 12 to a softened state and vacuum formed to provide low relief raised area 10b which represents a separation distortion pattern for the color yellow, as is clear from Figs. 2 and 4. Mid-portion 10a is then cooled to a desired hardness and an ink roller 19 applies yellow ink to raised area 10b with plateau 14a lying in flat plane X—X serving as a backing support for raised area 10b against pressure exerted by roller 19 in applying the ink.

After the yellow ink is applied, mold 14 is removed from contact with midportion 10a and the latter subjected to a second heating which aids in drying the ink and softens mid-portion 10a sufficiently to bring the elastic memory of the sheet material M into play and reduces to a flat surface the raised area 10b imprinted with the yellow distortion pattern area 10c, as shown in Fig. 5. While said second heating is taking place, the next mold 15 is brought into register below frame 11. In the second heated condition, mid-portion 10a is vacuum formed on mold 15 to provide raised areas conforming to red distortion pattern raised areas 15a. After cooling, red ink is applied by a suitable roller (not shown) in the same manner as roller 19 applied the yellow ink thereby adding red distortion pattern areas 10d to mid-portion 10a in proper register with yellow area 10c. Green distortion pattern areas 10e are likewise applied by means of mold 16 as many any additional desired color patterns.

As hereinbefore described, the vacuum forming of the low relief distortion pattern areas by mold 14, 15 and 16 is carried out at a minimum temperature, that is, a relatively low temperature as compared with the normal temperature required for the high relief vacuum forming. For example, when using so-called rigid vinyl sheets of from .010 to .020 gauge, from 200° F. to 250° F. is a suitable minimum temperature range.

Mid-portion 10a has now been printed with the various required colors disposed in distortion patterns 10c, 10d and 10e. This stage has been accomplished in a relatively short period of time and at the same location where the final deep drawn vacuum forming into a high relief surface is also performed.

With final deep mold 17 brought into register below frame 11 as shown in Fig. 6, mid-portion 10a is subjected to a final heating for softening to a required consistency and vacuum formed on mold 17 to obtain a high relief embossed and multi-colored surface plaque section AA. The latter may then be cut or stamped as by suitable steel rule dies from web 10 as article A shown in Fig. 7.

When using rigid vinyl sheets hereinbefore described, a final heating temperature of between 250° and 300° F. has been found to render satisfactory results.

Any ink suitable for the purpose and well known in the art may be used, preferably a plastic resin type ink having quick drying properties.

Whereas, raised areas 14a, 15a and 16a in the illustrative embodiment shown in the drawings define a flat continuous surface, it is within the contemplation of this invention to compose such areas as a series of spaced parallel lines, cross hatching, or dots of various sizes where required to render proper shading and desired tones in the finished surface design in the well understood manner.

When desirable, as for example, for producing surface detail to a high degree or when using sheet material of heavier gauge which does not lend itself to molding from the rear side thereof, female molds may be used instead of male type molds 14, 15, 16 and 17. In using such female molds, the low relief areas representing distortion patterns, those comparable to areas 10b shown in Fig. 4, are depressed from the normal plane of the sheet, that is, project downwardly so that the surface to be decorated with ink faces the mold. The improved method may be performed in such case by removing the sheet from contact with the mold after sufficient cooling time to permit hardening of the thermoplastic material, backing up the sheet on the side opposite the mold against any pressure exerted by the ink roller and then carrying out the ink rolling step on the undersurface, that is, on the surface facing the female mold. Each of the colors are applied in the same manner and the final vacuum forming step may also be carried out with the colored distortion patterns facing the mold.

In backing up the sheet formed with the low relief distortion pattern after removal from the mold prior to ink rolling, any suitable means may be used to support the sheet against distortion, such as, a plate faced with foam rubber to provide a resilient surface for preventing crushing of the distortion pattern. The backing will thus serve to maintain the sheet in its normal plane, while the sheet material will be required to possess sufficient rigidity to withstand any pressure exerted on the low relief areas in applying the ink. Use of female molds, therefore, becomes practical when the thermoplastic sheet material being formed has substantial rigidity.

It will thus be apparent that the improved method embodying the invention as hereinbefore described will be equally applicable to the manufacture of articles having a single color design and those of multi-color designs. By utilizing colored stock sheet material or by applying an over-all ink layer to the sheet surface prior to the initial vacuum forming step, a two-color design may be obtained with only a single low relief distortion pattern mold, the use of which has been found superior productionwise to present methods of color decorating vacuum formed articles.

As an alternative to performing the coloring and final vacuum forming steps embodying the invention at a single station C as shown in Fig. 1, molds 14, 15, 16 and 17 may be arranged at successively spaced stations to which supporting frames 11 carrying either mid-sections 10a of web 10 or precut sheets of thermoplastic material are progressively advanced to provide a continuous process of manufacture.

It is thus seen that there is provided an improved method for manufacturing multi-colored three-dimensional plaques by vacuum forming whereby the several objects of the invention are achieved and which are well adapted to meet the conditions of practical use.

As various possible embodiments might be made of the above invention, and as various changes might be made in the embodiments above set forth, it is to be understood that all matters herein set forth or shown in the accompanying drawings are to be interpreted as illustrative and not in a limiting sense.

Having thus described my invention, I claim as new and desire to secure by Letters Patent:

1. A method of manufacturing from thermoplastic sheet material relatively high relief three-dimensional plaques having surface coated areas forming portions of a design, comprising the steps of vacuum forming said sheet material to provide a low relief predetermined distortion pattern lying in a single plane corresponding to said surface coated areas, ink rolling said low relief distortion pattern to form a surface coated distortion pattern, and vacuum forming said sheet to a high relief configuration with said inked distortion pattern in register therewith forming the said surface coated design areas on a finished high relief three-dimensional plaque.

2. A method of manufacturing from thermoplastic sheet material relatively high relief three-dimensional plaques having surface coated areas forming portions of a design, comprising the steps of heating said sheet material to a required minimum temperature, vacuum forming the heated sheet to provide a low relief predetermined distortion pattern lying in a single plane spaced from the original plane of the sheet, cooling the vacuum formed sheet, applying ink to the low relief distortion pattern, heating the sheet with the inked distortion pattern to a required temperature for high relief vacuum forming, said temperature being higher than said minimum temperature, and vacuum forming said sheet to a high relief configuration with said inked distortion pattern in register therewith forming the said surface coated design areas on a finished high relief three-dimensional plaque.

3. A method of manufacturing from thermoplastic sheet material three-dimensional plaques having surface relief designs in a plurality of colors, comprising the steps of vacuum forming an area of said sheet material to provide low relief areas lying in a single plane and representing a predetermined first color separation distortion pattern for said surface relief design, applying a layer of colored ink to said relief areas to form a separation distortion pattern for said first color, repeating said vacuum forming and ink applying steps to said area to provide a separation distortion pattern for a second color in register with said first color, and vacuum forming said area to relatively deep drawn relief in register with said color separation distortion patterns forming a finished three-dimensional plaque.

4. A method of manufacturing relatively high relief three-dimensional plaques having a multi-colored surface design from thermoplastic sheet material comprising the steps of supporting an area of sheet material to be formed about a periphery thereof, vacuum forming said area to provide shallow drawn embossed areas lying in a single plane representing a color separation distortion pattern of said surface design, applying a layer of colored ink to said embossed areas forming an inked separation distortion pattern in said color on said area, repeating the vacuum forming and ink applying steps for each color required in said multi-colored surface design to provide corresponding color separation distortion patterns each in proper register with respect to the others, and vacuum forming said area into a relatively deep relief three-dimensional plaque with said distortion patterns forming said multi-colored surface design.

5. In a method of manufacturing from thermoplastic sheet material three-dimensional plaques having surface relief designs in a plurality of colors, the steps of vacuum forming at a required minimum temperature said sheet material to provide low relief areas lying in a single plane and representing a predetermined color separation distortion pattern for said surface relief design, cooling the vacuum formed sheet, applying ink to the low relief distortion pattern, and repeating said vacuum forming, cooling and ink applying steps at said minimum temperature for each color required in said multi-colored surface design to provide corresponding color separation distortion patterns each in proper register with respect to the others, the heating of the sheet material between each vacuum forming step serving to reduce the said low relief areas to the original flat sheet surface.

6. The method defined in claim 1 in which said low relief has a depth of between $1/16$th to $3/32$nds of an inch.

7. The method defined in claim 1 in which said low relief vacuum forming step is performed with male type molds to raise the low relief predetermined distortion pattern above the plane of the sheet material for receiving the ink roller.

8. The method defined in claim 1 in which said low relief vacuum forming step is performed with female type molds to depress the low relief predetermined distortion pattern below the plane of the sheet material, including the step of removing the low relief formed sheet from contact with the mold preparatory to inking the depressed surface facing the mold.

9. A method of manufacturing relatively high relief three-dimensional plaques having a multi-colored surface design from thermoplastic sheet material, comprising the steps of supporting an area of the sheet material to be formed about a periphery thereof, heating said area to a required minimum temperature, vacuum forming the heated area to provide shallow drawn embossed areas lying in a single plane representing a color separation distortion pattern of said surface design, cooling the vacuum formed sheet, applying a layer of colored ink to said embossed areas forming an inked separation distortion pattern in said color on said area, repeating the heating, vacuum forming and ink applying steps for each color required in said multi-colored surface design to provide corresponding color separation distortion patterns each in proper register with respect to the other, the heating of the sheet material between each vacuum forming step serving to reduce the shallow drawn embossed areas to the original flat sheet surface, and vacuum forming at a temperature higher than said minimum temperature said supported area into a relatively deep relief three-dimensional plaque with said distortion patterns forming said multi-colored surface design.

10. The method defined in claim 9 in which said shallow drawn embossed areas have a depth of between $1/16$th to $3/32$nds of an inch.

References Cited in the file of this patent

UNITED STATES PATENTS

| | | |
|---|---|---|
| 2,122,451 | Cassimatis | July 5, 1938 |
| 2,442,338 | Borkland | June 1, 1948 |
| 2,468,731 | Borkland | May 3, 1949 |
| 2,645,049 | Brown | July 14, 1953 |